Dec. 9, 1924.
H. ESSERT
IGNITION SYSTEM LOCK
Filed Sept. 22, 1922
Fig. 1.
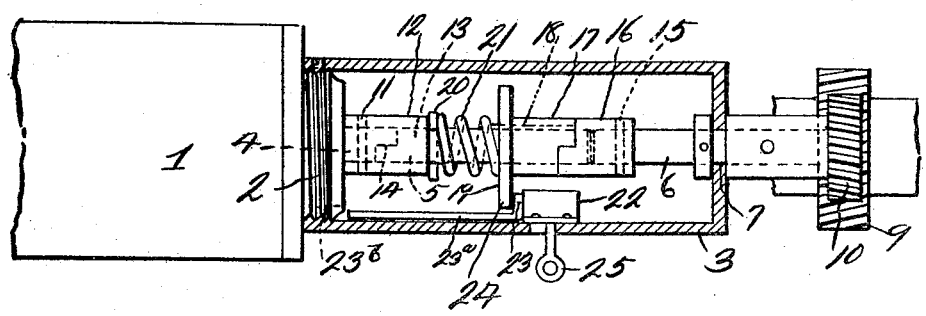
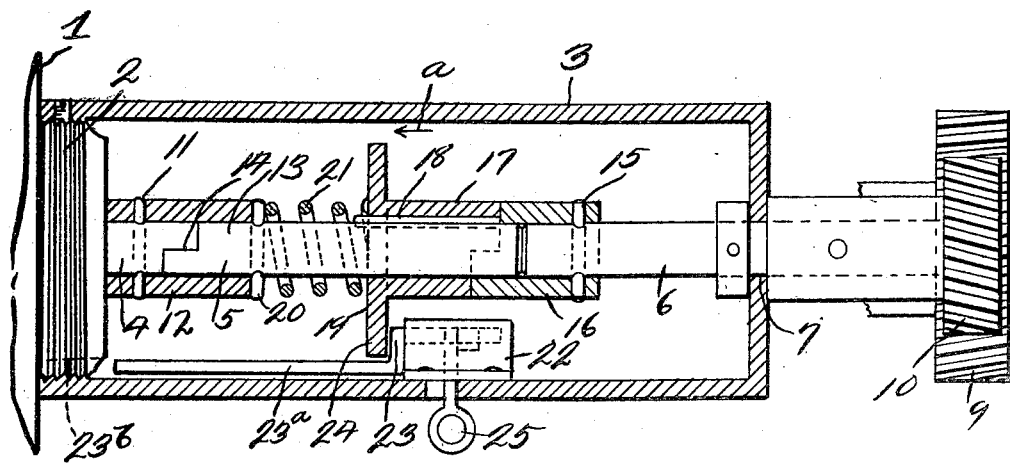
Fig. 2.
Inventor
H. Essert
By Philip A. H. Serrell
Attorney Patented Dec. 9, 1924.

1,518,496

UNITED STATES PATENT OFFICE.

HENRY ESSERT, OF GRETNA, NEBRASKA.

IGNITION-SYSTEM LOCK.

Application filed September 22, 1922. Serial No. 589,912.

*To all whom it may concern:*

Be it known that HENRY ESSERT, citizen of the United States, residing at Gretna, in the county of Sarpy and State of Nebraska, has invented certain new and useful Improvements in Ignition-System Locks, of which the following is a specification, reference being had therein to the accompanying drawings.

The invention relates to locks for ignition systems used in connection with internal combustion engines of motor driven vehicles, and has for its object to provide a device of this character wherein the generator shaft is formed in sections and disposed within a casing, the sections of the shaft being provided with clutch elements, which elements may be moved out of engagement with each other against the action of a spring, thereby disconnecting the generator and consequently preventing operation of the generator.

A further object is to provide the slidable clutch elements with an annular flange, with which flange a lock bolt cooperates for disconnecting the clutch elements and holding the same disconnected. The lock is carried by the casing.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a portion of a generator, showing the device applied to the shaft thereof, and a portion of the casing in section.

Figure 2 is a vertical longitudinal sectional view through the shaft casing, and the clutch mechanism.

Referring to the drawing, the numeral 1 designates a conventional form of ignition system generator and 2 a threaded extension thereof. Threaded on the threaded extension 2 is a cylindrical casing 3, through which the axially aligned generator shaft sections 4, 5, and 6 extend, the section 6 having a bearing 7 in the outer end of the casing 3. The generator shaft is driven in any suitable manner according to the design of the engine through a drive pinion 9 which meshes with the generator drive pinion 10. Secured on the shaft section 4 by means of a pin 11 is a sleeve 12 into which the end 13 of the shaft section 5 extends and is provided with a lapped joint 14 whereby sections 4 and 5 will rotate together. The section 5 is used as an extension section for shafts of engines now in use.

Secured to the shaft section 6 by means of a pin 15 is a clutch member 16, which clutch member rotates with the shaft 6, and when in engagement with the slidable clutch member 17, which is feathered on the key 18 of the shaft section 5, all of the shaft sections 4, 5 and 6 rotate together, thereby operating the generator 1. It will be seen that when the clutch members 16 and 17 are declutched that the operation of the generator through the drive pinions 9 and 10 will be prevented and consequently the ignition system will be inoperative. Interposed between the ends 19 of the clutch member 17 and the transversely disposed pin 20 carried by the shaft section 5 is a coiled spring 21, which coiled spring normally maintains the clutch members 16 and 17 in operative position. However when the clutch member 17 is moved in the direction of the arrow $a$, the shaft sections 5 and 6 will be disengaged and the shaft section 4 will not be rotated upon a rotation of the shaft section 6. To render the clutch inoperative a lock 22 is provided, which lock is carried by the inner wall of the casing 3 and has its bolt 23 in parallel relation to the shaft section and in engagement with an annular flange 24 carried by the clutch member 17. It will be seen that the bolt 23 is moved in the direction of the arrow $a$, it will engage the annular flange 24 and force the clutch member 17 to inoperative position against the action of the coiled spring 21, and will hold said clutch member in declutched position. The lock 22 may be of any conventional form, and is provided with a key 25 whereby the operator of the automobile may lock the device in declutched position, thereby preventing unauthorized persons from operating the vehicle. By providing an annular flange 24, it will be seen that no matter where the shafting stops when the vehicle stops that a portion of the annular flange will be in position where it will be engaged by the lock bolt 23. Also that when the device is unlocked the end of the extension 23$^a$ of the bolts 23 will be disposed in the recess 23$^b$ of the threaded extension 2 and consequently the casing 3 can not be unscrewed from the extension 2.

From the above it will be seen that a locking device is provided for ignition system which is simple in construction, the parts reduced to a minimum, and one wherein the action is positive.

The invention having been set forth what is claimed as new and useful is:—

The combination with a generator having a generator shaft, said shaft being formed in sections, a clutch member carried by one of said sections adjacent its ends, a feathered clutch element carried by the adjacent shaft, a coiled spring for normally forcing said clutch members in engagement, a casing surrounding the shaft sections, a lock carried by said casing, an annular flange carried by the slidable clutch member, a bolt controlled by said lock, said casing being threaded on the generator, said bolt being positioned whereby when the same is forced outwardly it will engage the annular flange and declutch the clutch members and will be received in a slot of the generator adjacent the threaded connection thereof to the casing.

In testimony whereof I hereunto affix my signature.

HENRY ESSERT.